(12) United States Patent
Aimura

(10) Patent No.: US 9,064,158 B2
(45) Date of Patent: Jun. 23, 2015

(54) VEHICLE SURROUNDINGS MONITORING DEVICE

(71) Applicant: HONDA MOTOR CO., LTD, Tokyo (JP)

(72) Inventor: Makoto Aimura, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 187 days.

(21) Appl. No.: 13/919,219

(22) Filed: Jun. 17, 2013

(65) Prior Publication Data

US 2014/0003670 A1    Jan. 2, 2014

(30) Foreign Application Priority Data

Jun. 29, 2012    (JP) ................................. 2012-147080

(51) Int. Cl.
*G06K 9/00*    (2006.01)
*G06T 7/00*    (2006.01)

(52) U.S. Cl.
CPC ........ *G06K 9/00805* (2013.01); *G06K 9/00362* (2013.01); *G06K 9/00791* (2013.01); *G06T 7/0085* (2013.01)

(58) Field of Classification Search
CPC .......... G06K 9/00791; G06K 9/00805; G06K 9/00362
USPC ................................................. 382/103, 104
See application file for complete search history.

(56) References Cited

U.S. PATENT DOCUMENTS

| | | | |
|---|---|---|---|
| 7,262,710 B2* | 8/2007 | Watanabe et al. | 340/903 |
| 7,586,400 B2 | 9/2009 | Nagaoka et al. | |
| 7,949,151 B2* | 5/2011 | Taniguchi et al. | 382/104 |
| 2003/0007074 A1* | 1/2003 | Nagaoka et al. | 348/148 |
| 2010/0283845 A1* | 11/2010 | Yokochi et al. | 348/135 |
| 2012/0041617 A1* | 2/2012 | Aimura et al. | 701/1 |
| 2012/0155707 A1* | 6/2012 | Kawano | 382/103 |
| 2013/0251206 A1* | 9/2013 | Ishikawa et al. | 382/103 |

FOREIGN PATENT DOCUMENTS

| | | |
|---|---|---|
| JP | 2007-213561 A | 8/2007 |
| JP | 2007-310705 A | 11/2007 |

* cited by examiner

*Primary Examiner* — Utpal Shah
(74) *Attorney, Agent, or Firm* — Westerman, Hattori, Daniels & Adrian, LLP

(57) ABSTRACT

There is provided a vehicle surroundings monitoring device including: a candidate animal area setting unit configured to set a candidate animal area including a candidate animal image portion and a surrounding area of the candidate animal image portion; an edge extraction unit configured to extract a horizontal edge from the candidate animal area; and an animal determination unit configured to determine whether or not a real space object corresponding to the candidate animal image portion is an animal based on a criterion that first and second horizontal edges in the candidate animal area have a strength greater than or equal to a first predetermined strength.

12 Claims, 5 Drawing Sheets

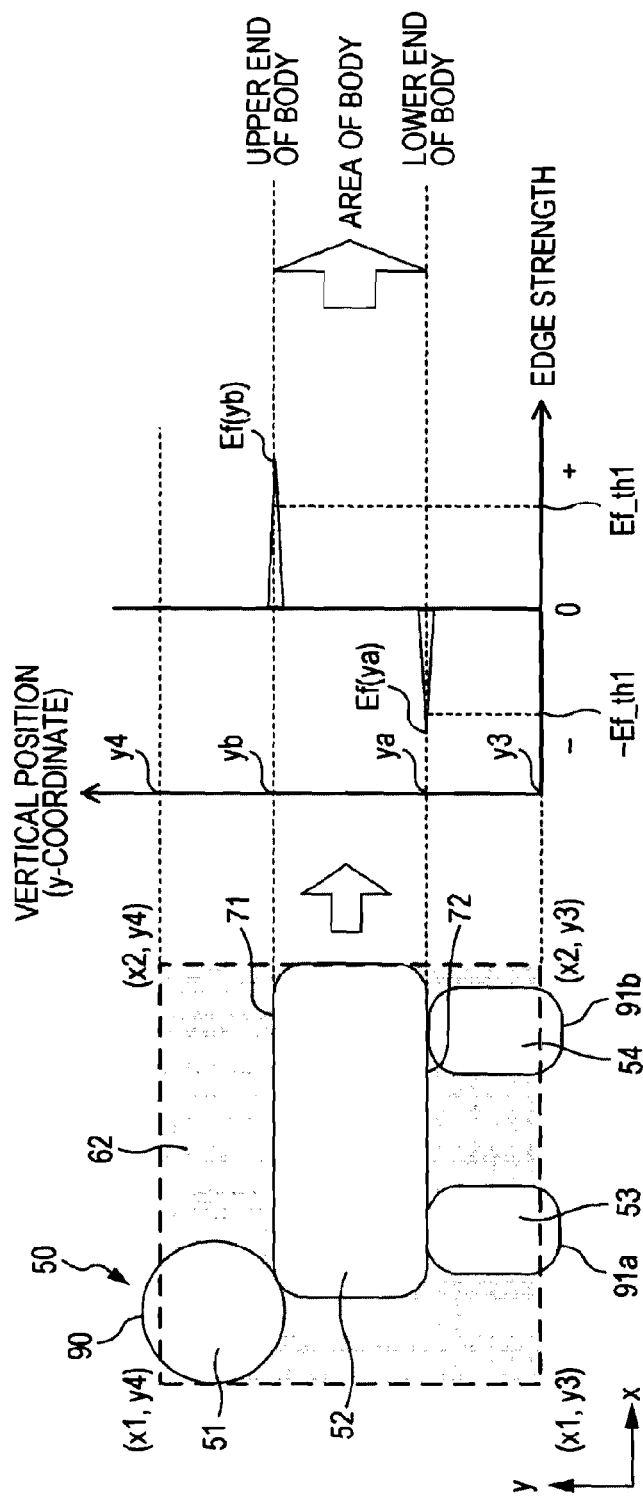

VEHICLE SURROUNDINGS MONITORING DEVICE

CROSS REFERENCES TO RELATED APPLICATIONS

The present application claims priority under 35 U.S.C. §119 to Japanese Patent Application No. 2012-147080, filed Jun. 29, 2012, entitled "Vehicle Surroundings Monitoring Device." The contents of this application are incorporated herein by reference in their entirety.

TECHNICAL FIELD

The present disclosure relates to a vehicle surroundings monitoring device which detects the presence of an animal in the surroundings of a vehicle based on images captured by a camera.

BACKGROUND

A vehicle surroundings monitoring device has been proposed that binarizes, based on a predetermined brightness threshold value, the data of images (gray scale images) of the surroundings of a vehicle which are captured by an infrared camera mounted on the vehicle, and extracts the image of a living body (such as a pedestrian, or an animal) which has a brightness greater than or equal to the brightness threshold value (for example, see Japanese Unexamined Patent Application Publication No. 2007-310705).

The vehicle surroundings monitoring device described in Japanese Unexamined Patent Application Publication No. 2007-310705 determines that a real space object corresponding to an extracted image is an animal (for example, a large animal such as a deer) when the extracted binary image includes a first elliptical object area corresponding to the body of the animal, and a plurality of second object areas which are located below the first object area and smaller than the first object area.

SUMMARY

In such a vehicle surroundings monitoring device described in Japanese Unexamined Patent Application Publication No. 2007-310705 in which an object is identified as an animal based on the shape and area of an extracted binary image, accuracy of identifying an object as an animal may be reduced by variation in the shape and area of the binary image of the object according to the conditions in which the image is captured.

The present disclosure has been made in view of such a background, and provides a vehicle surroundings monitoring device which can improve the accuracy of identifying an object as an animal.

A first aspect of the present disclosure preferably provides a vehicle surroundings monitoring device including: a candidate animal image portion extraction unit configured to extract a candidate animal image portion which is a possible image of an animal based on an image captured by a camera mounted on a vehicle; a candidate animal area setting unit configured to set a candidate animal area including the candidate animal image portion and a surrounding area of the candidate animal image portion; an edge extraction unit configured to extract a horizontal edge from the candidate animal area; and an animal determination unit configured to determine whether or not a real space object corresponding to the candidate animal image portion is an animal based on a criterion that first and second horizontal edges extracted by the edge extraction unit in the candidate animal area have a strength greater than or equal to a first predetermined strength.

In the first aspect of the present disclosure, when a horizontal edge is extracted from the candidate animal area including the image of an animal, a horizontal edge having high strength is extracted with a high probability at each of the upper and lower end positions of the image of the body because the body of the animal is long in the horizontal direction in general. Here, the strength of a horizontal edge is expressed by the number of pixel(s) which is qualified as an edge point among pixels contained in a certain horizontal range at each vertical position of the image of the candidate animal area. For example, provided that each vertical position of the candidate animal area is expressed as $y_j$ (ordinate), the certain horizontal range is expressed as a range from $x_l$ to $x_n$ (abscissa), and each pixel contained in a certain horizontal range at each vertical position is expressed as $(x_l, y_j)$, $(x_{l+1}, y_j)$, ... $(x_i, y_j)$, ... $(x_{n-l}, y_j)$, $(x_n, y_j)$. Here, the edge point is a point where one of two vertically adjacent pixels has a brightness value a predetermined value or more higher than the other of the vertically adjacent pixels.

Thus, the animal determination unit can determine with high accuracy whether or not a real space object corresponding to the candidate animal image portion is an animal based on a criterion that first and second horizontal edges extracted by the edge extraction unit in the candidate animal area have a strength greater than or equal to a first predetermined strength.

A second aspect of the present disclosure preferably provides the vehicle surroundings monitoring device according to the first aspect of the disclosure in which the animal determination unit determines whether or not the real space object corresponding to the candidate animal image portion is an animal based on a criterion that signs of the first horizontal edge and the second horizontal edge are different.

According to the second aspect, in the image of an animal captured by the camera, it is assumed that the brightness of the image of the body of the animal is substantially uniform and different from the brightness of the image of the background. Therefore, when a horizontal edge is extracted from the image of the animal by the edge extraction unit, it is probable that horizontal edges having different signs (positive or negative) are extracted at the upper and lower ends (boundary between the background, and the upper and lower ends of the body) of the image of the body of the animal. Thus, the animal determination unit can determine with high accuracy whether or not the real space object corresponding to the candidate animal image portion is an animal based on a criterion that signs of the first horizontal edge and the second horizontal edge are different.

A third aspect of the present disclosure preferably provides the vehicle surroundings monitoring device according to the first aspect of the disclosure in which the animal determination unit determines whether or not the real space object corresponding to the candidate animal image portion is an animal based on a criterion that the first horizontal edge has the highest strength among the horizontal edges extracted by the edge extraction unit, and the second horizontal edge is located lower than the first horizontal edge.

In the third aspect, in the image of the body of the animal captured by the camera, the upper end of the image is in contact with the image of the head of the animal, and the lower end thereof is in contact with the image of the legs of the animal. The region in which the lower end of the body is in contact with the legs is larger than the region in which the upper end of the body is in contact with the neck, and thus it is probable that a horizontal edge with the highest strength is extracted from the upper end of the image of the body. It is also probable that a horizontal edge with high strength is extracted from the lower end of the image of the body. Thus, the animal determination unit can determine with high accuracy whether or not the real space object corresponding to the candidate animal image portion is an animal based on a criterion that the first horizontal edge has the highest strength among the horizontal edges extracted by the edge extraction unit, and the second horizontal edge is located lower than the first horizontal edge.

A fourth aspect of the present disclosure preferably provides the vehicle surroundings monitoring device according to the first aspect of the disclosure in which the animal determination unit determines whether or not the real space object corresponding to the candidate animal image portion is an animal based on a criterion that the first horizontal edge has the highest strength among the horizontal edges extracted by the edge extraction unit, and the second horizontal edge has the second highest strength among the horizontal edges extracted by the edge extraction unit.

In the fourth aspect, when the candidate animal image portion is actually the image of an animal, it is probable that a horizontal edge having high strength is extracted at the upper and lower ends of the image of the body of the animal. Thus, the animal determination unit can determine with high accuracy whether or not the real space object corresponding to the candidate animal image portion is an animal based on a criterion that the first horizontal edge has the highest strength among the horizontal edges extracted by the edge extraction unit, and the second horizontal edge has the second highest strength among the horizontal edges extracted by the edge extraction unit.

A fifth aspect of the present disclosure preferably provides the vehicle surroundings monitoring device according to the first aspect of the disclosure in which the animal determination unit determines whether or not the real space object corresponding to the candidate animal image portion is an animal based on a criterion that a third horizontal edge having a second predetermined strength is not extracted from an area between the first horizontal edge and the second horizontal edge by the edge extraction unit, the second predetermined strength being less than the first predetermined strength.

In the fifth aspect, when the candidate animal image portion is actually the image of an animal, it is probable that the first horizontal edge and the second horizontal edge are respectively extracted at the upper and lower ends of the image of the body of the animal. At the same time, it is improbable that a horizontal edge is extracted from the image of the body of the animal between the first horizontal edge and the second horizontal edge.

Thus, the animal determination unit can determine with high accuracy whether or not the real space object corresponding to the candidate animal image portion is an animal based on a criterion that a horizontal edge having a second predetermined strength or more is not extracted between the first horizontal edge and the second horizontal edge by the edge extraction unit, the second predetermined strength being less than the first predetermined strength.

A sixth aspect of the present disclosure preferably provides the vehicle surroundings monitoring device according to the first aspect of the disclosure in which the animal determination unit determines whether or not the real space object corresponding to the candidate animal image portion is an animal based on a criterion that part of the candidate animal image portion located between the first horizontal edge and the second horizontal edge has a longer horizontal length than a vertical length.

According to the sixth aspect, since the body of the animal is long sideways in general, when the candidate animal image portion is actually the image of an animal, it is probable that part (which is assumed to be the image of the body of the animal) of the candidate animal image portion located between the first horizontal edge and the second horizontal edge has a longer horizontal length than a vertical length. Thus, the animal determination unit can determine with high accuracy whether or not the real space object corresponding to the candidate animal image portion is an animal based on a criterion that part of the candidate animal image portion located between the first horizontal edge and the second horizontal edge has a longer horizontal length than a vertical length.

A seventh aspect of the present disclosure preferably provides the vehicle surroundings monitoring device according to the first aspect of the disclosure in which the candidate animal area setting unit sets the candidate animal area with an upper boundary which is lower than an upper end of the candidate animal image portion.

According to the seventh aspect, a horizontal edge is prevented from being extracted by the edge extraction unit at the portion where the upper end of the candidate animal image portion is in contact with the boundary of the candidate animal area, and a horizontal edge can be extracted at the upper end of the image of the body of the animal.

An eighth aspect of the present disclosure preferably provides the vehicle surroundings monitoring device according to the first aspect of the disclosure in which the candidate animal area setting unit sets the candidate animal area with a lower boundary which is higher than a lower end of the candidate animal image portion.

According to the eighth aspect, a horizontal edge is prevented from being extracted by the edge extraction unit at the portion where the lower end of the candidate animal image portion is in contact with the boundary of the candidate animal area, and a horizontal edge can be extracted at the lower end of the image of the body of the animal.

A ninth aspect of the present disclosure preferably provides a vehicle surroundings monitoring including: a candidate animal image portion extraction unit configured to extract a candidate animal image portion which is a possible image of an animal based on an image captured by a camera mounted on a vehicle; a candidate animal area setting unit configured to set a candidate animal area including the candidate animal image portion and a surrounding area of the candidate animal image portion; and an alert processing unit configured to perform predetermined alert processing when first and second horizontal edges having a strength greater than or equal to a predetermined strength are present in the candidate animal area, and a horizontal edge having a strength greater than strengths of the first horizontal edge and the second horizontal edge is not present in an area between the first horizontal edge and the second horizontal edge.

According to the ninth aspect, when first and second horizontal edges having a strength greater than or equal to a predetermined strength are present in the candidate animal area, and a horizontal edge having a strength greater than strengths of the first horizontal edge and the second horizontal edge is not present between the first horizontal edge and the second horizontal edge, and thus it is assumed that the real space object corresponding to the candidate animal image portion is probably an animal, the alert processing unit performs the alert processing, thereby attracting the attention of the driver of the vehicle.

BRIEF DESCRIPTION OF THE DRAWINGS

The advantages of the disclosure will become apparent in the following description taken in conjunction with the following drawings.

FIG. 5 illustrates horizontal edges which are extracted when the candidate animal area is changed.

DETAILED DESCRIPTION

Figure 1:
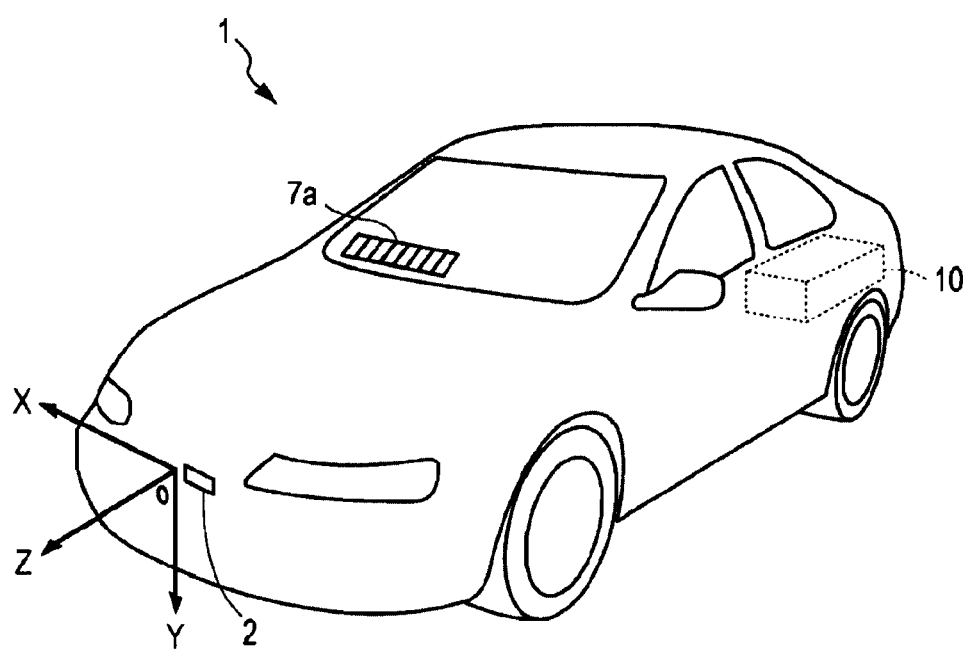
FIG. 1 illustrates an embodiment in which a vehicle surroundings monitoring device is mounted on a vehicle.

An exemplary embodiment of a vehicle surroundings monitoring device according to the present disclosure will be described with reference to FIGS. 1 to 5. Referring to FIG. 1, a vehicle surroundings monitoring device 10 in the present embodiment is mounted on a vehicle 1 for use. The vehicle 1 is equipped with an infrared camera 2 (corresponding to the camera in the present disclosure) which can detect a far infrared ray.

The infrared camera 2 has sensitivity to a far infrared range, and has characteristics such that the higher the temperature of a captured object, the higher the level of an output video signal (the brightness of the video signal increases). The infrared camera 2 is mounted to the front of the vehicle 1 in order to capture the front area of the vehicle 1. The space coordinate system is defined as follows: the front portion of the vehicle 1 is set as the origin O, the right and left direction is X-axis, the up and down direction is Y-axis, the front and rear direction is Z-axis. Instead of the infrared camera 2, a camera having sensitivity to other wavelength range such as visible light may be used.

Figure 2:
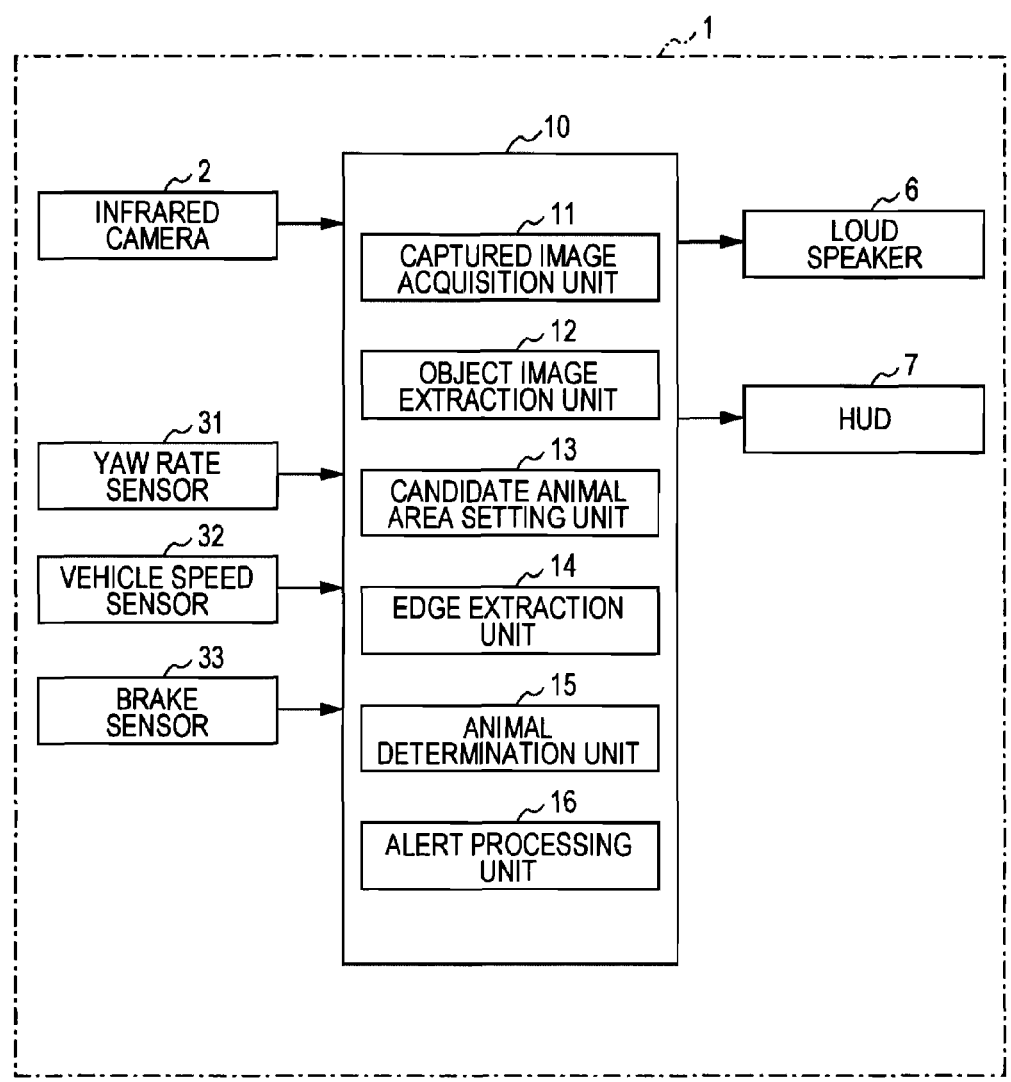
FIG. 2 is a configuration diagram of the vehicle surroundings monitoring device.

Next, referring to FIG. 2, the vehicle 1 includes a yaw rate sensor 31 which detects a yaw rate of the vehicle 1, a vehicle speed sensor 32 which detects the running speed of the vehicle 1, a brake sensor 33 which detects an amount of brake operation performed by a driver, a loud speaker 6 which attracts attention with sound, and a Head Up Display 7 (hereinafter referred to as HUD7) which displays an image captured by the infrared camera 2 and which displays an object for a driver to recognize the object which is likely to collide with the vehicle 1. As illustrated in FIG. 1, the HUD7 is provided such that a screen 7a is displayed at a position in front of a driver and on the front window of the vehicle 1.

The vehicle surroundings monitoring device 10 is an electronic unit including a CPU and a memory (not illustrated). By executing a program stored in the memory for controlling vehicle surroundings monitoring with the CPU, the vehicle surroundings monitoring device 10 serves as a captured image acquisition unit 11, an object image extraction unit 12 (including the function of the candidate animal image portion extraction unit of the present disclosure), a candidate animal area setting unit 13, an edge extraction unit 14, an animal determination unit 15, and an alert processing unit 16.

The vehicle surroundings monitoring device 10 extracts a possible image portion of a pedestrian or an animal from an image captured by the infrared camera 2 if that image portion satisfies predetermined conditions, then calculates the position of the real space object (position in real space) corresponding to the image portion using data including a yaw rate of the vehicle 1 detected by the yaw rate sensor 31, and a running speed of the vehicle 1 detected by the vehicle speed sensor 32, and calculates the moving vector of the real space object by tracking the image portion of the same object between captured images in time-series.

The vehicle surroundings monitoring device 10 then determines based on the moving vector whether the object should be subject to attention, and determines whether or not alert is to be given with voice output from the loud speaker 6 and/or highlight display on HUD7 in consideration of an operational situation of brakes, which is recognized based on signals detected by the brake sensor 33. It is to be noted that processing of alerting based on the moving vector is performed using, for example, the conventional technique described in Japanese Unexamined Patent Application Publication No. 2007-213561 (U.S. Pat. No. 7,586,400), the entire contents of which are incorporated herein by reference.

In addition, the vehicle surroundings monitoring device 10 identifies the type of the object (vehicle/artificial structure, pedestrian, animal), and monitors the object according to the type of the object. Hereinafter, monitor processing of an object (in particular, determination of the presence of an animal) by the vehicle surroundings monitoring device 10 will be described according to the flowchart shown in FIG. 3. The vehicle surroundings monitoring device 10 repeats the processing in the flowchart shown in FIG. 3, and monitors an object which is present in the surroundings of the vehicle 1.

Figure 3:
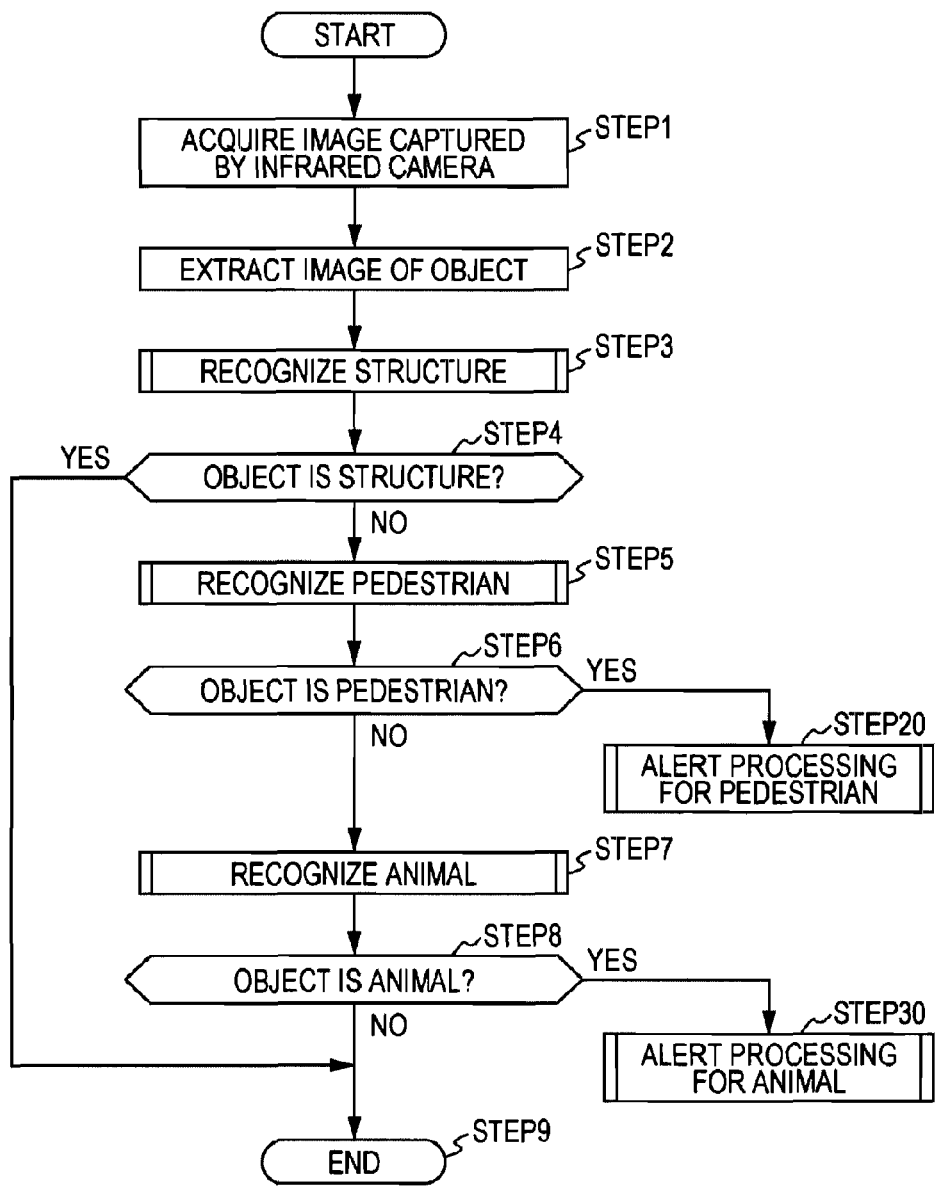
FIG. 3 is an operational flowchart of the vehicle surroundings monitoring device.

STEP1 in FIG. 3 is the processing performed by the captured image acquisition unit 11. The captured image acquisition unit 11 receives an input of a video signal which is outputted from the infrared camera 2, converts the video signal into a digital gradation (brightness) data, and stores a gray scale image corresponding to the digital gradation data, into an image memory.

Subsequent STEP2 is the processing performed by the object image extraction unit 12. For each pixel in the gray scale image, the object image extraction unit 12 performs binarization processing in which a pixel having a brightness greater than or equal to a predetermined threshold is set to "1" (white), and a pixel having a brightness less than the predetermined threshold is set to "0" (black), and generates a binary image.

The object image extraction unit 12 then calculates runlength data of each white area in the binary image, performs labeling processing or the like, and extracts a white image portion as the object image portion (including the candidate animal image portion of the present disclosure). Basically, the object image extraction unit 12 extracts an area as one object image portion, the area consisting of white pixels that are adjacent to each other. However, the object image extraction unit 12 may extract an area as one object image portion, the area including white pixels that are close to each other. In this manner, the configuration in which the object image extraction unit 12 extracts an object image portion which may be an image portion of an animal corresponds to the candidate animal image portion extraction unit in the present disclosure.

In subsequent STEP4 to STEP6, the vehicle surroundings monitoring device 10 determines whether or not the object (real space object corresponding to the object image portion) is a structure (other vehicle, a telephone pole) or a pedestrian. First in STEP3, the vehicle surroundings monitoring device 10 determines whether or not the object is a structure. Here, the determination of whether or not the object is a structure can be made using, for example, a known technique described in Japanese Unexamined Patent Application Publication No. 2007-310705 (U.S. Pat. No. 7,949,151), the entire contents of which are incorporated herein by reference.

When it is determined that the object is a structure, the process branches to STEP9 in next STEP4, and alert processing is not performed by the alert processing unit 16. On the other hand, when it is determined that the object is not a structure, the process proceeds to STEP5.

In STEP5, the vehicle surroundings monitoring device 10 determines whether or not the object is a pedestrian. Here, the determination of whether or not the object is a pedestrian can be made using a known technique described in Japanese Unexamined Patent Application Publication No. 2007-310705 (U.S. Pat. No. 7,949,151).

When it is determined that the object is a pedestrian, the process proceeds to STEP20 in next STEP6. When it is determined based on the moving vector of the real space object that the object is likely to collide with the vehicle 1, the alert processing unit 16 performs alert processing. On the other hand, when it is determined that the object is not a pedestrian in STEP6, the process proceeds to STEP7.

Here, as alert processing, the alert processing unit 16 displays highlight frame for the image portion of the pedestrian in a superimposed manner on the screen 7*a* of a captured image displayed by HUD7, and performs output processing of sound from the loud speaker 6 for alerting a pedestrian.

STEP7 is the processing performed by the candidate animal area setting unit 13, the edge extraction unit 14, and the animal determination unit 15. Here, FIG. 4 illustrates a binary image in which an object image portion 50 (corresponding to the candidate animal image portion of the present disclosure, hereinafter also referred to as a candidate animal image portion 50) is an image portion of an animal, including head 51, body 52 and legs 53, 54.

Figure 4:
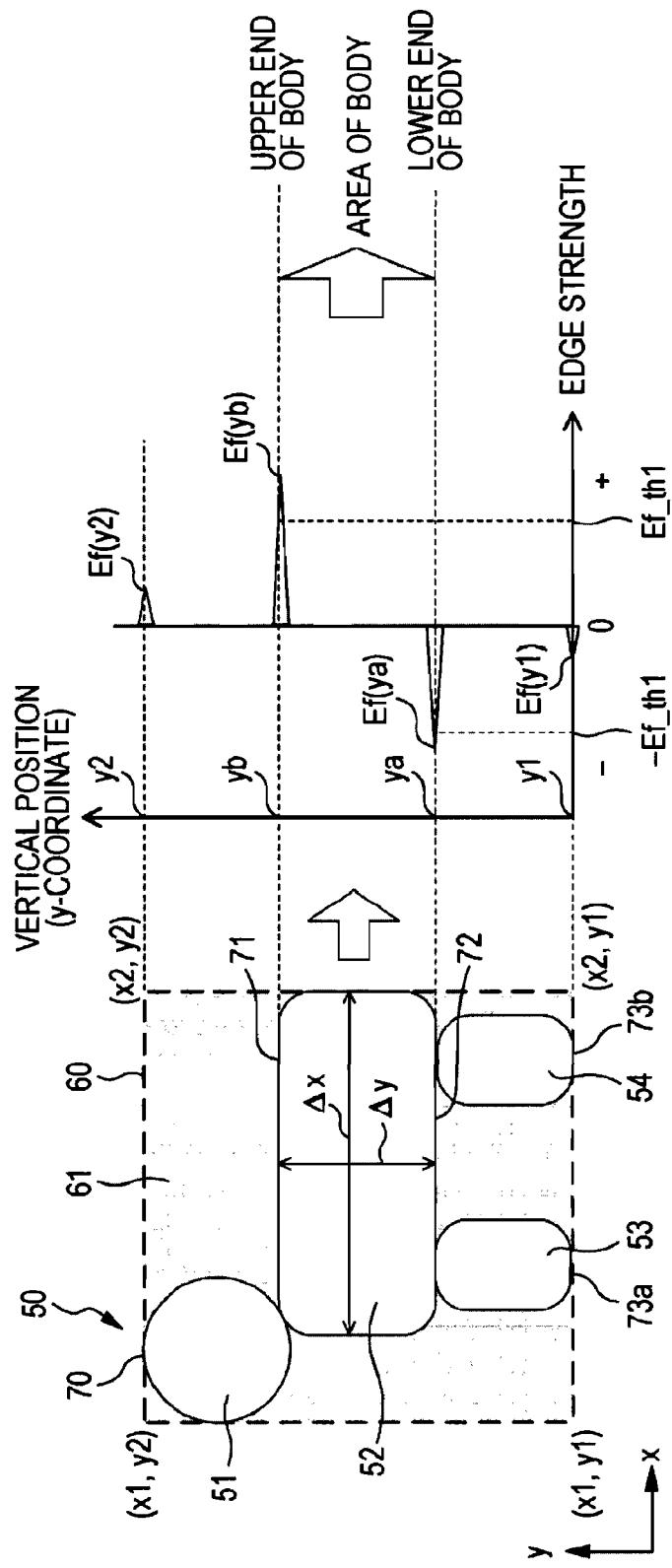
FIG. 4 illustrates horizontal edges which are extracted from a candidate animal area.

In the binary image in FIG. 4, pixels in the candidate animal image portion 50 are white, the pixels belonging to an animal image portion which is higher in temperature than the circumference, and pixels in the surroundings of the candidate animal image portion 50 are black (represented by dot patterns in FIG. 4). The candidate animal area setting unit 13 sets an area (the candidate animal image portion and its surrounding area) within a circumscribed quadrilateral 60 (a rectangle which is tangent to the upper end, the lower end, the left end, and the right end of the candidate animal image portion 50) of the candidate animal image portion 50 as a candidate animal area 61.

In FIG. 4, the coordinate of pixels in the image variable in the horizontal direction (right and left direction) is defined as x, and the coordinate of pixels in the image variable in the vertical direction (up and down direction) is defined as y. The candidate animal area 61 is set to a region which is defined by four points: $(x_1, y_1)$ $(x_2, y_1)$ $(x_2, y_2)$, and $(x_1, y_2)$. It is to be noted that the candidate animal area is not necessarily set to an area surrounded by a circumscribed quadrilateral, and may be set so as to contain the image portion which is assumed to be the body of the animal.

The edge extraction unit 14 extracts a horizontal edge for each y coordinate (y coordinate in the range of $y_1$ to $y_2$) of the candidate animal area 61, and calculates the strength of the horizontal edge. Here, the strength $Ef(y_j)$ of the horizontal edge at each y coordinate ($y=y_j$) is defined as the value of the sum of the difference between the brightness values (0 or 1) of the current pixel and upper adjacent pixel ($y=y_{j+1}$) over $x_1$ to $x_2$, and can be expressed by the following Expression 1.

$$Ef(y_j) = \sum_{i=x1}^{i=x2} (Y_{i,j} - Y_{i,j+1}) \quad (1)$$

where $Ef(y_j)$ is the strength value of the horizontal edge at y-coordinate=$y_j$, $Y_{i,j}$ is the brightness value of the pixel at $(x_i, y_j)$, and $Y_{i,j+1}$ is the brightness value of the pixel at $(x_i, y_{j+1})$.

In the present embodiment, the difference between the brightness values of the current pixel and the upper pixel (positive direction along y-axis) is obtained as indicated by the above Expression 1, and thus a positive edge point is defined as a pixel with the brightness difference of 1 (0→1) when scanning is performed from the upper side to the lower side along y-axis. Similarly, a negative edge point is defined as a pixel with the brightness difference of 1 (1→0). When the calculated value according to the above Expression 1 is positive, the horizontal edge is positive, and when the calculated value according to the above Expression 1 is negative, the horizontal edge is negative.

In FIG. 4, a horizontal edge 70 at the upper end position $y_2$ of the candidate animal image portion 50, a horizontal edge 71 at the upper end position $y_b$ of the body image portion 52 of the candidate animal image portion 50, a horizontal edge 72 at the lower end position $y_a$ of the body image portion 52 of the candidate animal image portion 50, and horizontal edges 73 (73*a*, 73*b*) at the lower end position $y_1$ of the candidate animal image portion 50 are extracted, and the strengths $Ef(y_2)$, $Ef(y_b)$, $Ef(y_a)$, $Ef(y_1)$ for the respective horizontal edges are calculated.

The highest strength horizontal edge among the horizontal edges 70 to 73 is the horizontal edge 71 at the upper end position $y_b$ of the body image portion 52, and the second highest strength horizontal edge is the horizontal edge 72 at the lower end position $y_a$ of the body image portion 52. No horizontal edge is extracted in the range between $y_a$ and $y_b$ of the body image portion 52.

Thus, the animal determination unit 15 determines whether or not the real space object corresponding to the candidate animal image portion 50 is an animal based on the following conditions (a) to (f).

(a) The first horizontal edge and the second horizontal edge (71, 72 in FIG. 4), both having a strength greater than or equal to the first predetermined strength (Ef_th in FIG. 4), are extracted from the candidate animal area 61.

(b) The signs of the first horizontal edge and the second horizontal edge extracted in (a) are different (the horizontal edge 71 is a positive edge and the horizontal edge 72 is a negative edge in FIG. 4).

(c) The first horizontal edge (the horizontal edge 71 in FIG. 4) extracted in (a) has the highest strength among the horizontal edges which are extracted by the edge extraction unit 14, and the second horizontal edge (the horizontal edge 72 in FIG. 4) is located below the first horizontal edge.

(d) The first horizontal edge and the second horizontal edge (the horizontal edges 71, 72 in FIG. 4) respectively have the highest strength and the second highest strength among the horizontal edges which are extracted by the edge extraction unit 14.

(e) A horizontal edge having a strength greater than or equal to the second predetermined strength (<the first predetermined strength) is not extracted between the first horizontal edge and the second horizontal edge.

(f) Part (the body image portion 52 in FIG. 4) of the candidate animal image portion 50 located between the first horizontal edge and the second horizontal edge extracted in (a) has a horizontal length ($\Delta x$ in FIG. 4) which is longer (the body is long sideways) than a vertical length ($\Delta y$ in FIG. 4).

The animal determination unit 15 determines whether or not the real space object corresponding to the candidate animal image portion is an animal by combining the above conditions (b) to (f) based on the above pre-condition (a). The animal determination unit 15 may determine whether or not the real space object corresponding to the candidate animal image portion is an animal based on only the condition (a), or may determine whether or not the real space object corresponding to the candidate animal image portion is an animal by combining the condition (a) and any subset of the above conditions (b) to (f).

When it is determined that the real space object corresponding to the candidate animal image portion is an animal, the process branches to STEP30 in the subsequent STEP8. STEP30 is the processing performed by the alert processing unit 16. Similarly to the above STEP20, the alert processing unit 16 performs alert processing for attracting the attention of a driver to the animal.

On the other hand, when it is determined that the real space object corresponding to the candidate animal image portion is not an animal, the process proceeds to STEP9, and the vehicle surroundings monitoring device 10 terminates the processing of one control cycle according to the flowchart illustrated in FIG. 3.

Next, another method of setting the candidate animal area by the candidate animal area setting unit 13 is provided in the following. As illustrated in FIG. 5, the candidate animal area 62 may be set with the upper end ($y_4$) lower than the upper end 90 of the candidate animal image portion 50, thereby preventing the horizontal edge 70 (strength $Ef(y_2)$)) extracted in FIG. 4 from being extracted.

Furthermore, as illustrated in FIG. 5, the candidate animal area 62 may be set with the upper end ($y_3$) higher than lower ends 91 (91a, 91b) of the candidate animal image portion 50, thereby preventing the horizontal edges 73 (73a, 73b) (strength $Ef(y_1)$) extracted in FIG. 4 from being extracted.

In addition to the above conditions (a) to (f), referring to FIG. 4, it may also be determined whether or not the real space object corresponding to the candidate animal image portion 50 is an animal, based on the conditions that a head image portion 51 is present above the body image portion 52 interposed between the first horizontal edge and the second horizontal edge (71, 72 in FIG. 4), or that image portions 53, 54 of a plurality of legs are present below the body image portion 52.

The present embodiment adopts a configuration in which images captured by one camera (the infrared camera 2) are used. However, a configuration may be adopted in which images captured by two cameras (stereo camera) are used, and the distance between the vehicle and the object is calculated based on the parallax between images of the same object captured by the stereo camera.

In the present embodiment, horizontal edges are extracted from a binary image as illustrated in FIGS. 4 and 5, however, horizontal edges may be extracted from a gray scale image.

I claim:

1. A vehicle surroundings monitoring device comprising:
    a candidate animal image portion extraction unit configured to extract, based on an image captured by a camera mounted on a vehicle, a candidate animal image portion which is a possible image portion of an animal;
    a candidate animal area setting unit configured to set a candidate animal area in the image, including the candidate animal image portion and a surrounding area of the candidate animal image portion;
    an edge extraction unit configured to extract a first horizontal edge and a second horizontal edge from the candidate animal area in the image; and
    an animal determination unit configured to determine whether or not a real space object corresponding to the candidate animal image portion is an animal based on a criterion that the first and second horizontal edges extracted by the edge extraction unit in the candidate animal area have a strength greater than or equal to a first predetermined strength, wherein the strength of the horizontal edge is the number of pixel qualified as an edge point among pixels contained in a certain horizontal range at each vertical position of the image.

2. The vehicle surroundings monitoring device according to claim 1,
    wherein the animal determination unit determines whether or not the real space object corresponding to the candidate animal image portion is an animal based on a criterion that signs of the first horizontal edge and the second horizontal edge are different.

3. The vehicle surroundings monitoring device according to claim 1,
    wherein the animal determination unit determines whether or not the real space object corresponding to the candidate animal image portion is an animal based on a criterion that the first horizontal edge has a highest strength among horizontal edges extracted by the edge extraction unit, and the second horizontal edge is located lower than the first horizontal edge in the image.

4. The vehicle surroundings monitoring device according to claim 1,
    wherein the animal determination unit determines whether or not the real space object corresponding to the candidate animal image portion is an animal based on a criterion that the first horizontal edge has a highest strength among horizontal edges extracted by the edge extraction unit, and the second horizontal edge has a second highest strength among horizontal edges extracted by the edge extraction unit.

5. The vehicle surroundings monitoring device according to claim 1,
    wherein the animal determination unit determines whether or not the real space object corresponding to the candidate animal image portion is an animal based on a criterion that a third horizontal edge having a second predetermined strength is not extracted from an area between the first horizontal edge and the second horizontal edge by the edge extraction unit, the second predetermined strength being less than the first predetermined strength.

6. The vehicle surroundings monitoring device according to claim 1,
    wherein the animal determination unit determines whether or not the real space object corresponding to the candidate animal image portion is an animal based on a criterion that part of the candidate animal image portion located between the first horizontal edge and the second horizontal edge has a longer horizontal length thereof than a vertical length thereof.

7. The vehicle surroundings monitoring device according to claim 1,
    wherein the candidate animal area setting unit sets the candidate animal area with an upper boundary which is lower than an upper end of the candidate animal image portion.

8. The vehicle surroundings monitoring device according to claim 1, wherein the candidate animal area setting unit sets the candidate animal area with a lower boundary which is higher than a lower end of the candidate animal image portion.

9. The vehicle surroundings monitoring device according to claim 2,
wherein the animal determination unit determines whether or not the real space object corresponding to the candidate animal image portion is an animal based on a criterion that signs of the first horizontal edge and the second horizontal edge are different when both of the first horizontal edge and the second horizontal edge are extracted by subtracting the brightness value of the upper adjacent pixel from the lower adjacent pixel.

10. A vehicle surroundings monitoring device comprising:
a candidate animal image portion extraction unit configured to, based on an image captured by a camera mounted on a vehicle, extract a candidate animal image portion which is a possible image of an animal;
a candidate animal area setting unit configured to set a candidate animal area in the image, including the candidate animal image portion and a peripheral area of the candidate animal image portion;
an edge extraction unit configured to extract a horizontal edge from the candidate animal area in the image; and
an alert processing unit configured to perform predetermined alert processing when the first and second horizontal edges having a strength greater than or equal to a predetermined strength are present in the candidate animal area, and a third horizontal edge having a strength greater than strengths of the first horizontal edge and the second horizontal edge is not present in an area between the first horizontal edge and the second horizontal edge, wherein the strength of the horizontal edge is the number of pixel qualified as an edge point among pixels contained in a certain horizontal range at each vertical position of the image.

11. A vehicle surroundings monitoring method comprising:
extracting, based on an image captured by a camera mounted on a vehicle, a candidate animal image portion which is a possible image portion of an animal;
setting a candidate animal area in the image, including the candidate animal image portion and a surrounding area of the candidate animal image portion;
extracting, by using a computer, a first horizontal edge and a second horizontal edge from the candidate animal area in the image; and
determining, by using a computer, whether or not a real space object corresponding to the candidate animal image portion is an animal based on a criterion that the first and second horizontal edges extracted in the candidate animal area have a strength greater than or equal to a first predetermined strength, wherein the strength of the horizontal edge is the number of pixel qualified as an edge point among pixels contained in a certain horizontal range at each vertical position of the image.

12. A vehicle surroundings monitoring device comprising:
a candidate animal image portion extraction means for extracting, based on an image captured by a camera mounted on a vehicle, a candidate animal image portion which is a possible image portion of an animal;
a candidate animal area setting means for setting a candidate animal area in the image, including the candidate animal image portion and a surrounding area of the candidate animal image portion;
an edge extraction means for extracting a first horizontal edge and a second horizontal edge from the candidate animal area in the image; and
an animal determination means for determining whether or not a real space object corresponding to the candidate animal image portion is an animal based on a criterion that the first and second horizontal edges extracted by the edge extraction means in the candidate animal area have a strength greater than or equal to a first predetermined strength, wherein the strength of the horizontal edge is the number of pixel qualified as an edge point among pixels contained in a certain horizontal range at each vertical position of the image.

* * * * *